United States Patent
Zhang

(10) Patent No.: US 10,720,966 B1
(45) Date of Patent: Jul. 21, 2020

(54) NEAR FIELD COMMUNICATION DEVICE AND INFORMATION PROCESSING METHOD

(71) Applicant: Alibaba Group Holding Limited, George Town (KY)

(72) Inventor: Hong Zhang, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/804,335

(22) Filed: Feb. 28, 2020

Related U.S. Application Data

(63) Continuation of application No. PCT/CN2020/071692, filed on Jan. 13, 2020.

(30) Foreign Application Priority Data

Jul. 22, 2019 (CN) .......................... 2019 1 0660435

(51) Int. Cl.
  *H04B 5/00* (2006.01)
  *G06K 7/10* (2006.01)
  (Continued)

(52) U.S. Cl.
  CPC ....... *H04B 5/0062* (2013.01); *G06K 7/10297* (2013.01); *H04B 5/0081* (2013.01);
  (Continued)

(58) Field of Classification Search
  CPC ... H04B 5/0062; H04B 5/0081; H04L 9/0825; H04L 9/3247; G06K 7/10297
  See application file for complete search history.

(56) References Cited

U.S. PATENT DOCUMENTS

| 7,506,820 B2 * | 3/2009 | Allard ................ G06K 7/10297 235/451 |
| 2005/0156709 A1 * | 7/2005 | Gilbert ................ G06K 7/0008 340/10.1 |

(Continued)

FOREIGN PATENT DOCUMENTS

| CN | 101561890 | 10/2009 |
| CN | 104730356 | 6/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Nabil H Syed
(74) *Attorney, Agent, or Firm* — Fish & Richardson P.C.

(57) ABSTRACT

Implementations of this specification provide a near field communication device and an information processing method performed by the near field communication device. An example device includes: an antenna; a radio frequency module connected to the antenna; a CPU circuit connected to the radio frequency module; and a power control module connected to the radio frequency module and the CPU circuit. The radio frequency module outputs, based on a radio frequency signal from the antenna, information conforming to a near field communication protocol of the radio frequency signal. The power control module controls the CPU circuit based on an indication included in the information, such that the CPU circuit is suppressed when a communication distance of the near field communication protocol of the radio frequency signal is greater than a predetermined threshold.

20 Claims, 5 Drawing Sheets

(51) Int. Cl.
*H04L 9/08* (2006.01)
*H04W 4/02* (2018.01)
*H04W 4/80* (2018.01)
*H04L 9/32* (2006.01)

(52) U.S. Cl.
CPC .......... *H04L 9/0825* (2013.01); *H04L 9/3247* (2013.01); *H04W 4/023* (2013.01); *H04W 4/80* (2018.02); *H04L 2209/805* (2013.01)

(56) References Cited

U.S. PATENT DOCUMENTS

| | | | | |
|---|---|---|---|---|
| 2009/0261949 | A1* | 10/2009 | Hara | G06K 7/0008 340/10.1 |
| 2011/0212687 | A1 | 9/2011 | Foster | |
| 2014/0148097 | A1 | 5/2014 | Kao | |
| 2014/0256252 | A1* | 9/2014 | Geslin | H04B 5/0031 455/41.1 |
| 2015/0038082 | A1 | 2/2015 | Sekine et al. | |
| 2019/0384951 | A1* | 12/2019 | Stiglic | H04B 5/0075 |

FOREIGN PATENT DOCUMENTS

| | | |
|---|---|---|
| CN | 104881694 | 9/2015 |
| CN | 106797235 | 5/2017 |
| CN | 110427791 | 11/2019 |
| KR | 101739522 | 5/2017 |

OTHER PUBLICATIONS

Nakamoto, "Bitcoin: A Peer-to-Peer Electronic Cash System," www.bitcoin.org, 2005, 9 pages.

Jiang et al., "Research and Application of Security Authentication System Based on RFID and NFC Technology," Computer Applications and Software, Sep. 2017, 34(9)317-321 (with English abstract).

PCT International Search Report and Written Opinion in International Application No. PCT/CN2020/071692, dated Apr. 8, 2020, 18 pages (with machine translation).

* cited by examiner

NEAR FIELD COMMUNICATION DEVICE AND INFORMATION PROCESSING METHOD

CROSS-REFERENCE TO RELATED APPLICATIONS

This application is a continuation of PCT Application No. PCT/CN2020/071692, filed on Jan. 13, 2020, which claims priority to Chinese Patent Application No. 201910660435.1, filed on Jul. 22, 2019, and each application is hereby incorporated by reference in its entirety.

TECHNICAL FIELD

Implementations of the present specification relate to the field of the near field communication technology, and more specifically, to an NFC device and an information processing method based on the NFC device.

BACKGROUND

Recently, the near field communication (NFC) technology has become increasingly popular, for example, the NFC technology is used for anti-counterfeiting or integrated into mobile phones for card reading, payment, etc. Developed on the basis of the radio frequency identification (RFID) technology, NFC can transmit signals between two objects that are geographically close to each other NFC is a short-range high-frequency radio technology, which operates at 13.56 MHz within a distance of 20 cm. Compared with RFID, NFC has lower costs, higher bandwidth, lower energy than RFID, etc. Currently, NFC standardization is promoted in the frameworks of ISO 18092, ECMA 340, and ETSI TS 102 190 protocols, and is compatible with widely used ISO 14443A, ISO 14443B, ISO 15693, and Felica protocols. Among them, the ISO 15693 protocol has a longer communication distance than the ISO 14443 protocol, and the communication distance can be 1.5 m at high energy. Therefore, the ISO 15693 protocol is advantageous in supply chain management in plants. The IOS 14443 standard has the security characteristic of being not easily attacked by man-in-the-middle in financial-level applications of banks because its communication distance is less than 10 cm. Generally, bank-related NFC cards are based on the ISO 14443 protocol. Among NFC cards, compared with an NFC card with a logic circuit, an NFC card with a CPU circuit has disadvantages such as high costs and high power consumption, and consequently does not support long-range communication. However, asymmetric national cryptographic algorithm such as SM2 can be used at a front end, which has a higher security level.

SUMMARY

Implementations of the present specification are intended to provide a more effective near field communication technology, to alleviate disadvantages in the existing technology.

To achieve the previous objective, an aspect of the present specification provides a near field communication device, including: an antenna; a radio frequency module connected to the antenna, where the radio frequency module outputs, based on a radio frequency signal from the antenna, first information conforming to a first near field communication protocol; a CPU circuit; and a power control module, where the CPU circuit is connected to the radio frequency module by using the power control module, and the power control module controls the CPU circuit based on an indication included in the first information, so that the CPU circuit is suppressed when a communication distance of the first near field communication protocol is greater than a predetermined threshold.

In an implementation, the indication is a protocol identifier or a particular instruction.

In an implementation, the device further includes: a logic circuit, where the logic circuit is connected to the radio frequency module by using the power control module; and the power control module further causes the logic circuit to be suppressed when the communication distance of the first near field communication protocol is less than the predetermined threshold.

In an implementation, the power control module includes a MOS transistor switch or a clock pulse switch.

In an implementation, the device further includes a storage module, where the CPU circuit and the logic circuit are respectively connected to the storage module, the device is an anti-counterfeit electronic label, and the storage module stores anti-counterfeit information.

In an implementation, the radio frequency module includes a demodulator, and a first decoder and a second decoder that are respectively connected to the demodulator, where the first decoder and the second decoder respectively correspond to two near field communication protocols, and the demodulator outputs, based on a protocol identifier included in a demodulated baseband signal of the demodulator, the baseband signal to a corresponding decoder, where a communication distance of one of the two near field communication protocols is less than the predetermined threshold, and a communication distance of the other near field communication protocol is greater than the predetermined threshold.

In an implementation, the two near field communication protocols are the ISO 14443A protocol and the ISO 15693 protocol, respectively.

Another aspect of the present specification provides an information processing method based on a near field communication device, where the near field communication device is the previous near field communication device; and the method includes: receiving first information from a reader/writer by using the radio frequency module based on induction of the antenna; and controlling the CPU circuit by using the power control module based on an indication included in the first information, so that the CPU circuit is suppressed from performing information processing in response to the first information when a communication distance of the first near field communication protocol is greater than a predetermined threshold.

In an implementation, the power control module includes a first clock pulse switch connected to the CPU circuit; and controlling the CPU circuit by using the power control module based on an indication included in the first information includes: causing the first clock pulse switch to provide a reduced clock frequency or stop providing a clock signal when the communication distance of the first near field communication protocol is greater than the predetermined threshold and a clock frequency provided by the first clock pulse switch is an operating frequency.

In an implementation, controlling the CPU circuit by using the power control module based on an indication included in the first information includes: causing the first clock pulse switch to restore the provided clock frequency to the operating frequency when the communication distance of the first near field communication protocol is less than the predetermined threshold and the clock frequency provided by the first clock pulse switch is not the operating frequency, so that the CPU circuit performs information processing in response to the first information.

In an implementation, the method further includes: controlling the logic circuit by using the power control module based on an indication included in the first information, so that the logic circuit is suppressed from performing information processing in response to the first information when the communication distance of the first near field communication protocol is less than the predetermined threshold.

In an implementation, the power control module further includes a second clock pulse switch connected to the logic circuit; and controlling the logic circuit by using the power control module based on an indication included in the first information further includes: causing the second clock pulse switch to provide a reduced clock frequency or stop providing a clock signal when the communication distance of the first near field communication protocol is less than the predetermined threshold and the clock frequency of the second clock pulse switch is an operating frequency.

In an implementation, controlling the CPU circuit by using the power control module based on an indication included in the first information includes: causing the second clock pulse switch to restore the provided clock frequency to the operating frequency when the communication distance of the first near field communication protocol is less than the predetermined threshold and the clock frequency provided by the second clock pulse switch is not the operating frequency, so that the CPU circuit performs information processing in response to the first information.

In an implementation, the power control module includes a MOS transistor switch connected to the CPU circuit; and controlling the CPU circuit by using the power control module based on an indication included in the first information includes: switching the MOS transistor switch to a disconnected state when the communication distance of the first near field communication protocol is greater than the predetermined threshold and the MOS transistor switch is connected.

In an implementation, controlling the CPU circuit by using the power control module based on an indication included in the first information includes: switching the MOS transistor switch to a connected state when the communication distance of the first near field communication protocol is less than the predetermined threshold and the MOS transistor switch is disconnected.

In an implementation, the storage module stores anti-counterfeit data and a key; and causing the logic circuit to perform information processing in response to the first information includes: causing the logic circuit to encrypt the anti-counterfeit data by using the key, to obtain the encrypted anti-counterfeit data for use as second information; and the method further includes: sending the second information to the reader/writer by using the radio frequency module and the antenna.

In an implementation, the storage module further stores a private key, a public key, and a first digital signature of the public key that is added by an authority; the first information includes a first random number, and causing the CPU circuit to perform information processing in response to the first information includes: causing the CPU circuit to sign the anti-counterfeit data and the random number to obtain a second digital signature, so that the anti-counterfeit data, the public key, the first digital signature, and the second digital signature are used as second information; and the method further includes: sending the second information to the reader through the radio frequency module and the antenna.

In an implementation, receiving first information from a reader/writer by using the radio frequency module based on induction of the antenna includes: demodulating, by the demodulator, a signal induced by the antenna into a baseband signal, outputting the baseband signal to a corresponding decoder based on a protocol identifier included in the baseband signal, and converting, by the corresponding decoder, the baseband signal into binary data for use as the first information.

The NFC device according to the implementations of the present specification can be used to perform long-range communication and has a high security level, and therefore has a higher applicability.

BRIEF DESCRIPTION OF DRAWINGS

To make the implementations of the present specification clearer, the following describes the implementations of the present specification with reference to the accompanying drawings.

DESCRIPTION OF IMPLEMENTATIONS

The following describes the implementations of the present specification with reference to the accompanying drawings.

Figure 1:
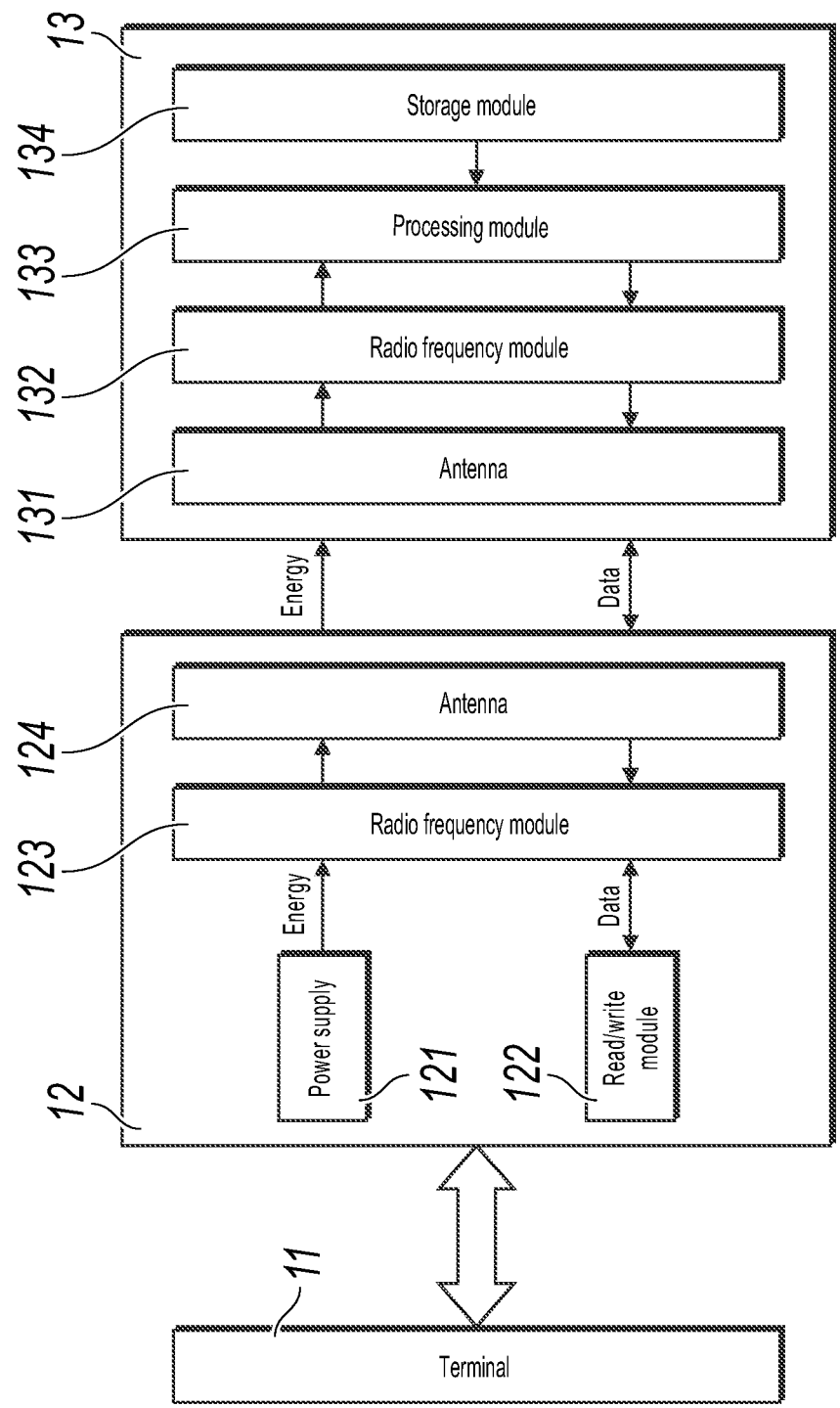
FIG. 1 is a schematic diagram illustrating an NFC system.

FIG. 1 is a schematic diagram illustrating an NFC system. As shown in FIG. 1, the system includes a terminal 11, a reader/writer 12, and an NFC device 13. The terminal 11 is, for example, a computing processing device such as a computer or a mobile phone. The reader/writer 12 supplies energy and transmits data to the NFC device 13 by transmitting 13.56 MHz radio frequency signals. The reader/writer 12 is a read/write device for the NFC device 13, including a power supply 121, a read/write module 122, a radio frequency module 123, and an antenna 124. The power supply 121 provides energy to the radio frequency module 123; the read/write module 122 provides data to the radio frequency module 123; and after modulating a baseband signal, the radio frequency module 123 transmits a corresponding radio frequency signal by using the antenna 124. The NFC device 13 is, for example, an NFC label, or an NFC module in a mobile phone. The NFC device 13 includes an antenna 131, a radio frequency module 132, a processing module 133, and a storage module 134. After being powered by the reader/writer 12, the NFC device 13 parses data from the received radio frequency by using the radio frequency module 132, performs data processing in the processing module 133 based on the data and data stored in the storage module 134, and sends information to the reader/writer 12 based on a processing result. After receiving the information from the NFC device 13, the reader/writer 12 transmits the information to the terminal 11 for service processing.

It can be understood that the NFC system shown in FIG. 1 is only an example and is not used to limit the implementations of the present specification. The following describes in detail a structure of an NFC device according to an implementation of the present specification and an information processing method based on the NFC device.

Figure 2:
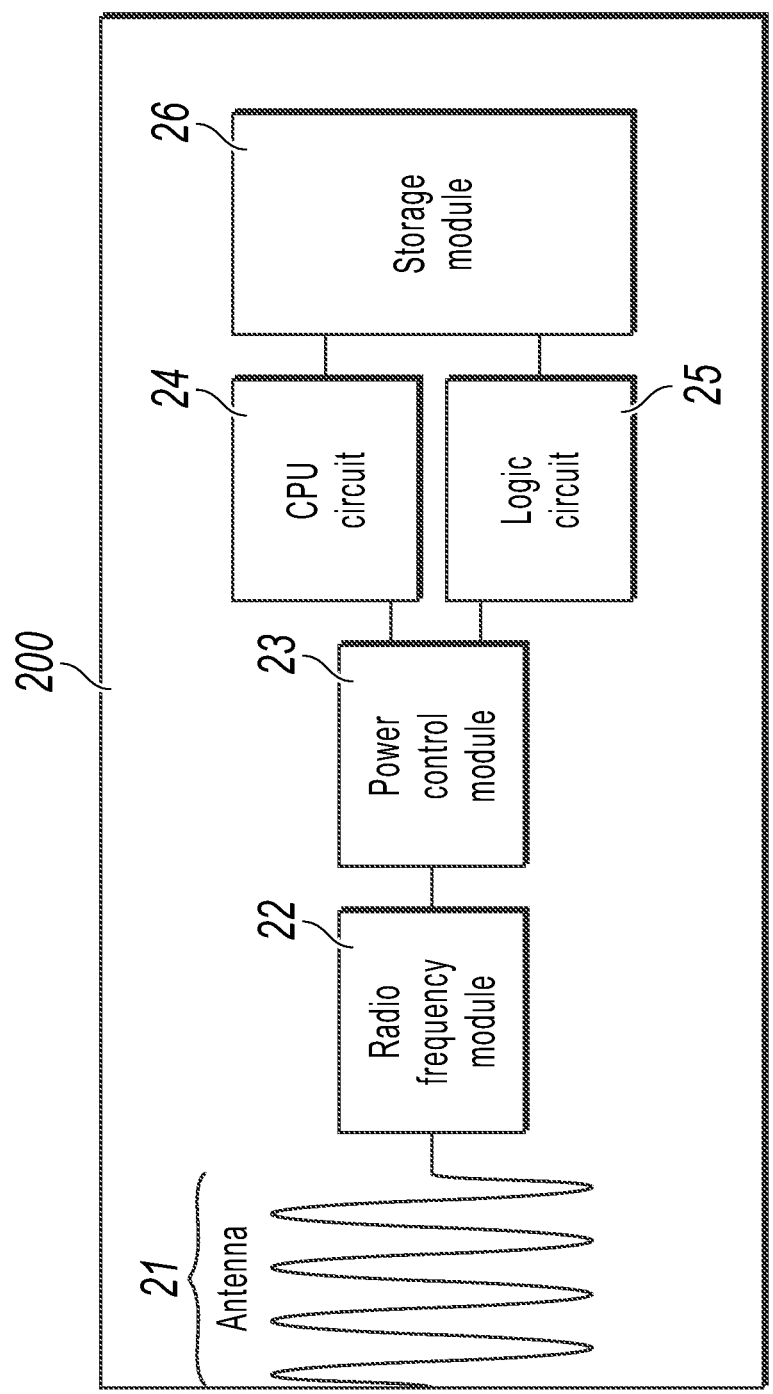
FIG. 2 is a schematic diagram illustrating a near field communication device 200, according to an implementation of the present specification.
Figure 3:
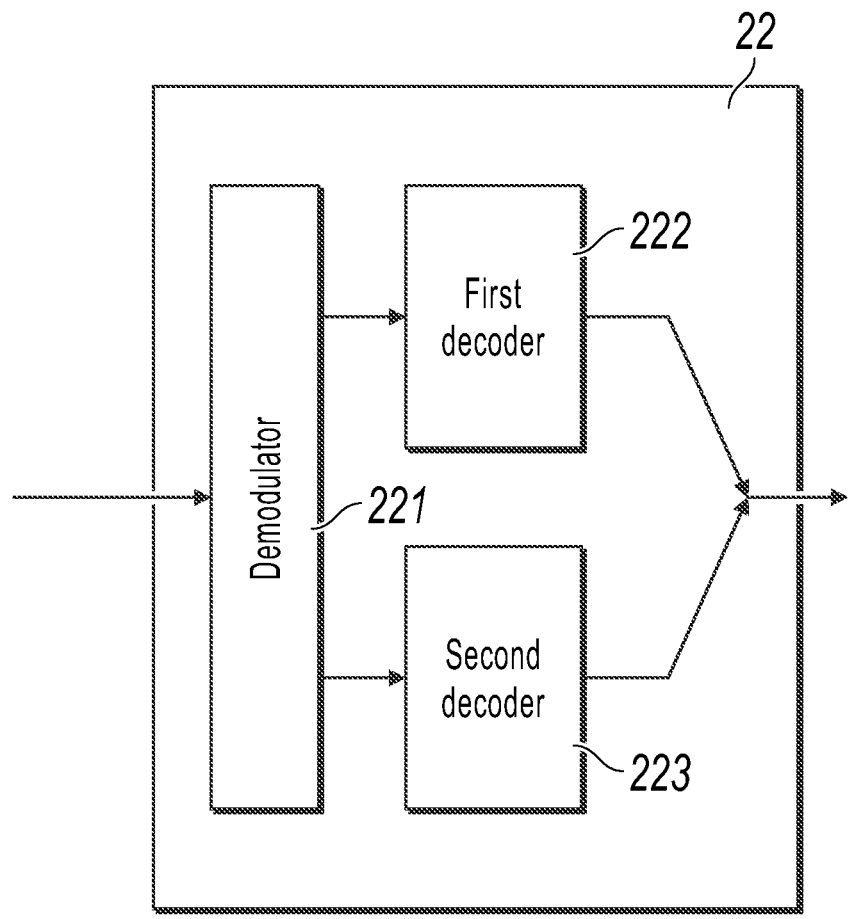
FIG. 3 illustrates an example structure of a radio frequency module 22.

FIG. 2 is a schematic diagram illustrating a near field communication device 200, according to an implementation of the present specification. As shown in FIG. 2, the device 200 includes: an antenna 21; a radio frequency module 22 connected to the antenna 21; a power control module 23; a CPU circuit 24; a logic circuit 25; and a storage module 26. The antenna is, for example, a 13.56 MHz antenna known to a person skilled in the art. The radio frequency module can output, based on a radio frequency signal from the antenna, first information that conforms to a first near field communication protocol or a near field communication protocol, where a communication distance of the second near field communication protocol is greater than a predetermined threshold, and a communication distance of the first near field communication protocol is less than the predetermined threshold. The predetermined threshold is, for example, 10 cm or 15 cm; the first near field communication protocol is, for example, ISO 14443A or ISO 14443B; and the second near field communication protocol is, for example, ISO 15693. FIG. 3 illustrates an example structure of the radio frequency module 22. As shown in FIG. 3, the radio frequency module 22 includes a demodulator 221, a first decoder 222, and a second decoder 223. For example, the first decoder 222 corresponds to the ISO 14443A protocol, and the second decoder 223 corresponds to the ISO 15693 protocol. After demodulating a signal induced by an antenna, the demodulator 221 obtains a baseband signal, where the baseband signal is usually a digital signal. The baseband signal, for example, a signal in a predetermined period (for example, a signal in a first period), is used to indicate a protocol identifier, so that a protocol corresponding to the baseband signal can be determined by reading the signal in the predetermined period of the baseband signal, and the baseband signal can be output to a corresponding decoder. For example, it may be preset that the signal in the first period corresponds to the ISO 14443A protocol when the signal in the first period is at a high level and the signal in the first period corresponds to the ISO 15693 protocol when the signal in the first period is at a low level, so that the protocol corresponding to the baseband signal can be determined by reading the signal level in the first period, and the baseband signal can be output to the corresponding decoder. It can be understood that the structure of the radio frequency module 22 is not limited thereto. For example, the radio frequency module 22 many include more than two decoders to correspond to different protocols. For example, the radio frequency module 22 may further include a third decoder to correspond to the ISO 14443B protocol.

It can be understood that the first near field communication protocol is not limited to the ISO 14443 (A/B) protocol, and the second near field communication protocol is not limited to the ISO 15693 protocol, provided that its communication distance conforms to a predetermined standard.

The CPU circuit 24 and the logic circuit 25 are respectively configured to process first information that conforms to the first and second near field communication protocols, the CPU circuit 24 and the logic circuit 25 are connected to the radio frequency module 22 by the power control module 23, and the power control module controls the CPU circuit 24 and the logic circuit 25 based on an indication from a reader/writer, so that the CPU circuit is suppressed when the first information conforms to the second near field communication protocols. In addition, the CPU circuit 24 and the logic circuit 25 are respectively connected to the storage module 26. The CPU circuit 24 includes complex arithmetic logic, and the logic circuit 25 includes simple arithmetic logic.

In an implementation, the first information is a protocol packet that conforms to a particular protocol, and the protocol packet includes a protocol packet identifier, for example, "15693", so that after receiving the protocol packet from the radio frequency module 22, the power control module 23 can determine switching control on the CPU circuit and the logic circuit based on the protocol packet identifier of the protocol packet. In an implementation, the information from the reader/writer includes a predetermined instruction, for example, it may be preset that an instruction "01" corresponds to suppression of the CPU circuit, so that the power control module can perform a corresponding operation after receiving the instruction from the radio frequency module 22.

Figure 4:
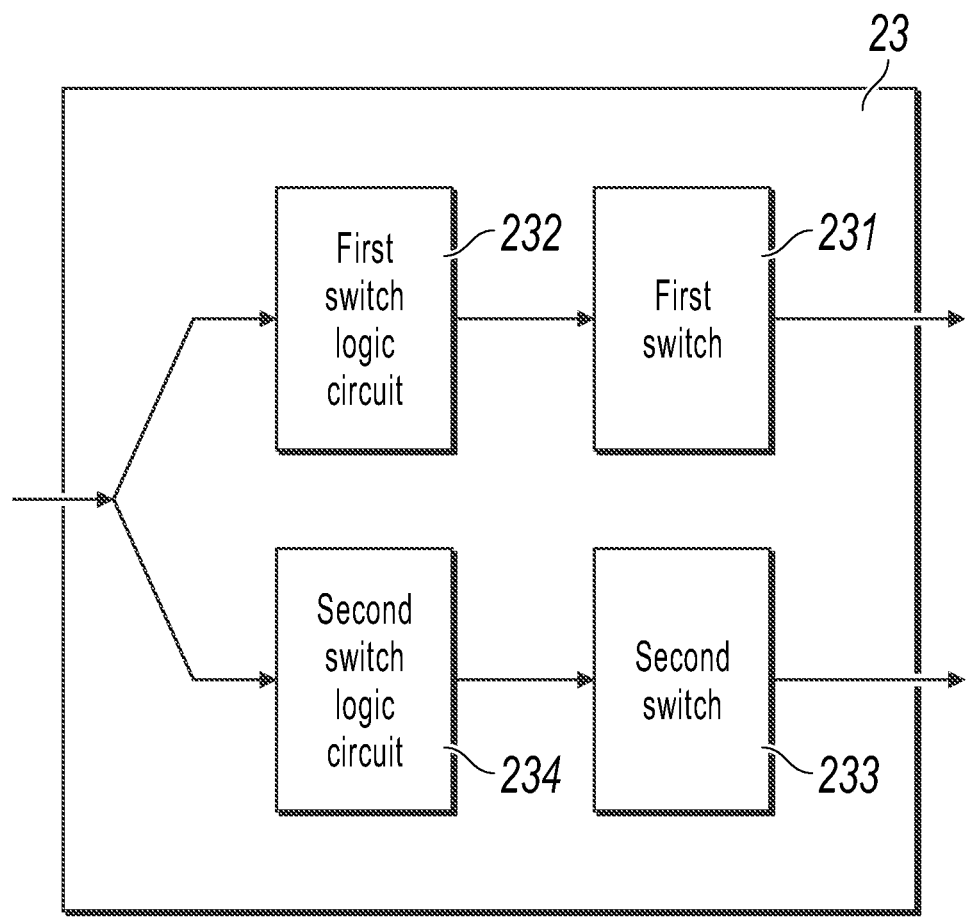
FIG. 4 illustrates an example structure of a power control module 23.

FIG. 4 illustrates an example structure of the power control module 23. As shown in the figure, the power control module 23 includes, for example, a first switch 231, a first switch logic circuit 232, a second switch 233, and a second switch logic circuit 234, where the first switch 231 and the first switch logic circuit 232 are connected in series between the radio frequency unit 22 and the CPU circuit 24 and are configured to implement power control on the CPU circuit, and the second switch 233 and the second switch logic circuit 234 are connected in series between the radio frequency unit 22 and the logic circuit 25 and are configured to implement control on the logic circuit.

In an implementation, the first switch and the second switch are two MOS transistor (metal-oxide-semiconductor field effect transistor) switches that are respectively connected to the CPU circuit and the logic circuit. In this case, the switch of the MOS transistor may be controlled by using a corresponding switch logic circuit. For example, the switch logic circuit can adjust voltage of the corresponding CPU circuit or logic circuit based on an indication from the reader/writer, to control the MOS transistor switch. For example, when it is determined, based on the indication from the reader/writer, that communication is performed based on the ISO 15693 protocol, the power supply to the CPU circuit can be turned off by using the MOS transistor switch connected to the CPU circuit. For example, when it is determined, based on the indication from the reader/writer, that communication is performed based on the ISO 14443 (A/B) protocol, the power supply to the CPU circuit can be turned on or off by using the MOS transistor connected to the CPU circuit, and the power supply to the logic circuit can be turned on or off by using the MOS transistor connected to the logic circuit based on a predetermined rule.

In an implementation, the first switch and the second switch are two clock pulse switches that are respectively connected to the CPU circuit and the logic circuit. In this case, input clock pulses of the clock pulse switches can be controlled by using the corresponding switch logic circuit. For example, the switch logic circuit can adjust the input clock pulses of each clock pulse switch based on indications from the reader/writer, to control the clock pulse switch. For example, when it is determined, based on the indication from the reader/writer, that communication is performed based on the ISO 15693 protocol, the clock frequency of the CPU circuit can be reduced or the clock can be turned off by using a clock pulse switch connected to the CPU circuit. When it is determined, based on the indication from the reader/writer, that communication is performed based on the ISO 14443 protocol, the clock frequency of the CPU circuit can be restored by using the clock pulse switch connected to the CPU circuit, and the clock frequency of the logic circuit can be controlled (suppressed or not suppressed) by using the clock pulse switch connected to the logic circuit based on a predetermined rule.

In an implementation, when the first information includes an indication corresponding to the ISO 14443A protocol, the clock frequency of the logic circuit is reduced or the clock of the logic circuit is turned off by using the second switch; or when the first information includes an indication corresponding to the ISO 15693 protocol, the clock frequency of the logic circuit is restored by using the second switch.

It can be understood that the power control module 23 shown in FIG. 4 is only an example and is not used to limit the implementations of the present specification. For example, when the CPU circuit is suppressed only in the case of long-range communication and the logic circuit is not controlled in the case of short-range communication, the logic circuit does not need to be connected to the power control module 23, but can be directly connected to the radio frequency module 22 as in the existing technology. Therefore, the power control module 23 needs to include only the first switch logic circuit 232 and the first switch 231 that are connected to the CPU circuit, that is, the power control module 23 controls only the CPU circuit, so that the near field communication device does not consume the induced power supply due to the operation of the CPU circuit during the long-range communication, and the power supply is sufficient for the long-range communication.

If the first near field communication protocols and the second near field communication protocols respectively include a plurality of protocols, when the radio frequency module 22 sends, by using the power control module 23, the first information that conforms to the first near field communication protocols, to the CPU circuit, the CPU circuit selects a corresponding protocol based on the protocol identifier of the first information to process the first information.

The near field communication device is, for example, an anti-counterfeit electronic label, so that anti-counterfeit information is stored in the storage module 26. A specific process of performing anti-counterfeit by using the anti-counterfeit electronic label is described in detail below.

Figure 5:
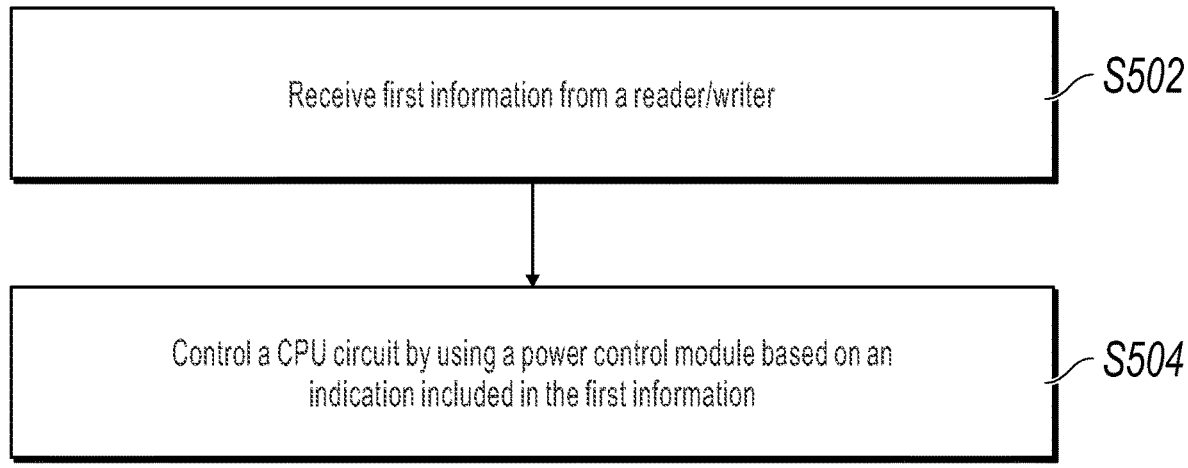
FIG. 5 is a flowchart illustrates an information processing method based on a near field communication device, according to an implementation of the present specification.

FIG. 5 is a flowchart illustrates an information processing method based on a near field communication device, according to an implementation of the present specification. The near field communication device is the device shown in FIG. 2, and the method includes:

Step S502: Receive first information from a reader/writer by using the radio frequency module based on induction of the antenna.

Step S504: Control the CPU circuit by using the power control module based on an indication included in the first information, so as to suppress the CPU circuit to perform information processing in response to the first information when a communication distance of the first near field communication protocol is greater than a predetermined threshold.

The near field communication device is, for example, the near field communication device shown in FIG. 2. The near field communication device includes two control circuits, that is, a CPU circuit and a logic circuit, so that information processing can be performed by selecting the two control circuits based on received information.

First, in step S502, the first information is received from the reader/writer by using the radio frequency module based on the induction of the antenna.

The radio frequency module converts a radio frequency signal induced by the antenna into binary data for use as the first information. Depending on different near field communication protocols used by reader/writer, the binary data conform to different protocol standards. For details about this step, references can be made to the description about the radio frequency module 22. Details are omitted here.

In an implementation, the NFC device is an anti-counterfeit electronic label; and the CPU circuit and the logic circuit each include a corresponding encryption and decryption unit, and the encryption and decryption units have different security levels, that is, a security level of the CPU circuit is higher than a security level of the logic circuit. In an implementation, when the anti-counterfeit electronic label is read using an ISO 15693 compliant reader/writer, the first information sent to the label by using a radio frequency signal conforms to the ISO 15693 protocol, that is, the first information is an ISO 15693 protocol packet, the protocol packet includes the protocol identifier of the ISO 15693 protocol, and the first information further includes a read instruction. In an implementation, the first information may further include a predetermined instruction for instructing to use a logic circuit.

In an implementation, when the anti-counterfeit electronic label is read using an ISO 14443 compliant reader/writer, the first information sent to the label by using a radio frequency signal conforms to the ISO 14443 protocol, that is, the first information is an ISO 14443 protocol packet, the protocol packet includes the protocol identifier of the ISO 14443 protocol, and the first information further includes a random number used for asymmetric encryption in addition to a read instruction. In an implementation, the first information may further include a predetermined instruction for instructing to use the CPU circuit.

In step S504, the CPU circuit is controlled by using the power control module based on the indication included in the first information, so that the CPU circuit is suppressed from performing information processing in response to the first information when the communication distance of the first near field communication protocol is greater than the predetermined threshold.

The indication is, for example, the previous protocol packet identifier or predetermined instruction.

In an implementation, the power control module includes a first clock pulse switch connected to the CPU circuit; and controlling the CPU circuit by using the power control module based on an indication included in the first information includes: causing the first clock pulse switch to provide a reduced clock frequency or stop providing a clock signal when the communication distance of the first near field communication protocol is greater than the predetermined threshold and a clock frequency provided by the first clock pulse switch is an operating frequency. When the communication distance of the first near field communication protocol is less than the predetermined threshold and the clock frequency provided by the first clock pulse switch is not an operating frequency, the first clock pulse switch restores the provided clock frequency to the operating frequency, so that the CPU circuit performs information processing in response to the first information.

In an implementation, the method further includes: controlling the logic circuit by using the power control module based on an indication included in the first information, so that the logic circuit is suppressed from performing information processing in response to the first information when the communication distance of the first near field communication protocol is less than the predetermined threshold.

The power control module further includes a second clock pulse switch connected to the logic circuit; and controlling the logic circuit by using the power control module based on an indication included in the first information further includes: causing the second clock pulse switch to provide a reduced clock frequency or stop providing a clock signal when the communication distance of the first near field communication protocol is less than the predetermined threshold and the clock frequency of the second clock pulse switch is an operating frequency; or causing the second clock pulse switch to restore the provided clock frequency to the operating frequency when the communication distance of the first near field communication protocol is greater than the predetermined threshold and the clock frequency provided by the second clock pulse switch is not the operating frequency, so that the logic circuit performs information processing in response to the first information.

In an implementation, the power control module includes a MOS transistor switch connected to the CPU circuit; and controlling the CPU circuit by using the power control module based on an indication included in the first information includes: switching the MOS transistor switch to a disconnected state when the communication distance of the first near field communication protocol is greater than the predetermined threshold and the MOS transistor switch is connected; or switching the MOS transistor switch to a connected state when the communication distance of the first near field communication protocol is less than the predetermined threshold and the MOS transistor switch is disconnected.

In an implementation, the device is an anti-counterfeit electronic label, the storage module stores anti-counterfeit data and a key, and the CPU circuit and the logic circuit include an encryption and decryption unit, where when the first information instructs to use, for example, the ISO 15693 protocol, the power control unit performs control to cause the logic circuit to encrypt the anti-counterfeit data by using the key, so as to obtain the encrypted anti-counterfeit data for use as the second information. The key is a symmetric key. For example, the key is internally generated based on the anti-counterfeit electronic label and is registered with an authority. The method further includes: after the second information is obtained, sending the second information to the reader/writer by using the radio frequency module and the antenna. Therefore, after receiving the second information by using the reader/writer, the third party can invoke the key management service of the authority to verify authenticity of the second information. That is, the method is an online verification method.

In an implementation, the storage module further stores a private key and a first digital signature of the public key that is added by an authority, and the first information includes a first random number, where when the first information includes an indication the ISO 14443 protocol, the power control unit performs control to cause the CPU circuit to the private key to sign the anti-counterfeit data and the random number, so as to use the anti-counterfeit data, the first digital signature, and the second digital signature as the second information. The method further includes sending the second information to the reader/writer by using the radio frequency module and the antenna. After receiving the second information, the third party can first use the pre-obtained public key of the authority to verify authenticity of the first digital signature, so as to verify authenticity of the public key in the NFC device; and then use the public key of the NFC device to verify authenticity of the anti-counterfeit data. That is, the method is an offline verification method.

The NFC device can send the second information to the reader/writer, for example, by using a load modulation technology. When the NFC device includes a power supply, the NFC device can also proactively send second information to a reader and writer by transmitting radio frequency signals.

According to the NFC device provided in this implementation of the present specification, the power supply of the CPU circuit is controlled by using the power control module based on a particular protocol, so that the CPU circuit is suppressed in the long-range communication, so that the power is sufficient for the long-range communication. Therefore, the NFC device can be used to perform long-range communication and has a high security level, and therefore has a higher applicability.

It should be understood that terms such as "first" and "second" in the present specification are only used to distinguish between similar concepts for ease of description, and does not impose any other limitation.

It is worthwhile to note that the implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

A person of ordinary skill in the art can be further aware that, in combination with the examples described in the implementations disclosed in the present specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person of ordinary skill the art can use different methods to implement the described functions for each particular application, but it should not be considered that the implementation goes beyond the scope of the present disclosure.

In combination with the implementations disclosed in the present specification, method or algorithm steps can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A near field communication device, comprising:
an antenna;
a radio frequency module connected to the antenna, wherein the radio frequency module outputs, based on a radio frequency signal from the antenna, information conforming to a near field communication protocol of the radio frequency signal;
a CPU circuit connected to the radio frequency module;
a power control module connected to the radio frequency module and the CPU circuit, wherein the power control module controls the CPU circuit based on an indication included in the information, such that the CPU circuit is suppressed when a communication distance of the near field communication protocol of the radio frequency signal is greater than a predetermined threshold; and
a logic circuit connected to the power control module, wherein the power control module causes the logic circuit to be suppressed when the communication distance of the near field communication protocol is less than the predetermined threshold.

2. The device of claim 1, wherein the indication includes one or more of a protocol identifier and a particular instruction.

3. The device according to claim 1, further comprising a storage module connected to the CPU circuit and the logic circuit, wherein the device is an anti-counterfeit electronic label, and the storage module stores anti-counterfeit information.

4. The device of claim 1, wherein the power control module includes at least one MOS transistor switch.

5. The device of claim 1, wherein the power control module includes at least one clock pulse switch.

6. The device of claim 1, wherein the radio frequency module includes a demodulator, a first decoder, and a second decoder, the first decoder and the second decoder being connected to the demodulator and respectively corresponding to a first near field communication protocol having a communication distance that is less than the predetermined threshold, and a second near field communication protocol having a communication distance that is greater than the predetermined threshold, wherein the demodulator outputs, based on a protocol identifier included in a demodulated baseband signal of the demodulator, the demodulated baseband signal to a corresponding decoder.

7. The device of claim 6, wherein the first near field communication protocol is an ISO 14443A protocol and the second near field communication protocol is an ISO 15693 protocol.

8. A computer-implemented method, comprising:
receiving, by a near field communication device that includes (i) an antenna, (ii) a radio frequency module connected to the antenna, (iii) a CPU circuit connected to the radio frequency module, (iv) a power control module connected to the radio frequency module and the CPU circuit, and (v) a logic circuit connected to the power control module, first information from a reader/writer by using the radio frequency module based on induction of the antenna;
determining, based on the first information, that a communication distance of a near field communication protocol is greater than a predetermined threshold;
in response to determining that a communication distance of a near field communication protocol is greater than a predetermined threshold, controlling the CPU circuit by using the power control module based on an indication included in the first information, such that the CPU circuit is suppressed from performing information processing, and
controlling the logic circuit by using the power control module based on the indication included in the first information, such that the logic circuit is suppressed from performing information processing in response to the first information when the communication distance of the near field communication protocol is less than the predetermined threshold.

9. The computer-implemented method of claim 8, wherein the power control module includes a first clock pulse switch connected to the CPU circuit, wherein controlling the CPU circuit by using the power control module based on the indication included in the information comprises causing the first clock pulse switch to provide a reduced clock frequency or stop providing a clock signal when the communication distance of the near field communication protocol is greater than the predetermined threshold and a clock frequency provided by the first clock pulse switch is an operating frequency.

10. The computer-implemented method of claim 9, wherein controlling the CPU circuit by using the power control module based on the indication included in the information comprises causing the first clock pulse switch to restore the provided clock frequency to the operating frequency when the communication distance of the near field communication protocol is less than the predetermined threshold and the clock frequency provided by the first clock pulse switch is not the operating frequency, such that the CPU circuit performs information processing in response to the first information.

11. The computer-implemented method of claim 10, wherein the near field communication device includes a storage module connected to the CPU circuit, wherein the storage module stores a private key, a public key, and a first digital signature of the public key that is added by an authority, wherein the first information includes a random number, and wherein causing the CPU circuit to perform information processing in response to the first information comprises causing the CPU circuit to sign anti-counterfeit data and the random number to obtain a second digital signature, so that the anti-counterfeit data, the public key, the first digital signature, and the second digital signature are used as second information; and the method further comprises sending the second information to the reader through the radio frequency module and the antenna.

12. The computer-implemented method of claim 8, wherein the power control module includes a second clock pulse switch connected to the logic circuit, wherein controlling the logic circuit by using the power control module based on the indication included in the first information further comprises causing the second clock pulse switch to provide a reduced clock frequency or stop providing a clock signal when the communication distance of a near field communication protocol is less than the predetermined threshold and the clock frequency of the second clock pulse switch is an operating frequency.

13. The computer-implemented method of claim 12, wherein controlling the logic circuit by using the power control module based on the indication included in the first information further comprises causing the second clock pulse switch to restore the provided clock frequency to the operating frequency when the communication distance of the near field communication protocol is greater than the predetermined threshold and the clock frequency provided by the second clock pulse switch is not the operating frequency, such that the logic circuit performs information processing in response to the first information.

14. The computer-implemented method of claim 13, wherein the near field communication device includes a storage module connected to the CPU circuit and the logic circuit, wherein the storage module stores anti-counterfeit data and a key, wherein causing the logic circuit to perform information processing in response to the first information comprises causing the logic circuit to encrypt the anti-counterfeit data by using the key, to obtain the encrypted anti-counterfeit data for use as second information, the method further comprising sending the second information to the reader/writer by using the radio frequency module and the antenna.

15. The computer-implemented method of claim 8, wherein the near field communication device includes a demodulator, a first decoder, and a second decoder, the first decoder and the second decoder being connected to the demodulator, wherein receiving the first information from the reader/writer by using the radio frequency module based on induction of the antenna comprises demodulating, by the demodulator, a signal induced by the antenna into a baseband signal, outputting the baseband signal to a corresponding decoder based on a protocol identifier included in the baseband signal, and converting, by the corresponding decoder, the baseband signal into binary data for use as the first information.

16. The computer-implemented method of claim 8, wherein the power control module includes a MOS transistor switch connected to the CPU circuit, wherein controlling the CPU circuit by using the power control module based on the indication included in the first information comprises switching the MOS transistor switch to a disconnected state when the communication distance of a near field communication protocol is greater than the predetermined threshold and the MOS transistor switch is connected.

17. The computer-implemented method of claim 16, wherein controlling the CPU circuit by using the power control module based on the indication included in the first information comprises switching the MOS transistor switch to a connected state when the communication distance of the near field communication protocol is less than the predetermined threshold and the MOS transistor switch is disconnected.

18. A non-transitory, computer-readable medium storing one or more instructions executable by a computer system to perform operations comprising:
receiving, by a near field communication device that includes (i) an antenna, (ii) a radio frequency module connected to the antenna, (iii) a CPU circuit connected to the radio frequency module, (iv) a power control module connected to the radio frequency module and the CPU circuit, and (v) a logic circuit connected to the power control module, first information from a reader/writer by using the radio frequency module based on induction of the antenna;
determining, based on the first information, that a communication distance of a near field communication protocol is greater than a predetermined threshold;
in response to determining that a communication distance of a near field communication protocol is greater than a predetermined threshold, controlling the CPU circuit by using the power control module based on an indication included in the first information, such that the CPU circuit is suppressed from performing information processing, and
controlling the logic circuit by using the power control module based on the indication included in the first information, such that the logic circuit is suppressed from performing information processing in response to the first information when the communication distance of the near field communication protocol is less than the predetermined threshold.

19. The non-transitory, computer-readable medium of claim 18, wherein the power control module includes a second clock pulse switch connected to the logic circuit, wherein controlling the logic circuit by using the power control module based on the indication included in the first information further comprises causing the second clock pulse switch to provide a reduced clock frequency or stop providing a clock signal when the communication distance of a near field communication protocol is less than the predetermined threshold and the clock frequency of the second clock pulse switch is an operating frequency.

20. The non-transitory, computer-readable medium of claim 18, wherein the near field communication device includes a demodulator, a first decoder, and a second decoder, the first decoder and the second decoder being connected to the demodulator, wherein receiving the first information from the reader/writer by using the radio frequency module based on induction of the antenna comprises demodulating, by the demodulator, a signal induced by the antenna into a baseband signal, outputting the baseband signal to a corresponding decoder based on a protocol identifier included in the baseband signal, and converting, by the corresponding decoder, the baseband signal into binary data for use as the first information.

\* \* \* \* \*